Dec. 2, 1941.     W. BRACKMANN     2,264,655
VALVE
Filed May 11, 1940

INVENTOR
WILLEM BRACKMANN
By Young, Emery & Thompson
ATTYS.

Patented Dec. 2, 1941

2,264,655

UNITED STATES PATENT OFFICE 2,264,655

VALVE

Willem Brackmann, Haarlem, Netherlands, assignor to N. V. Bureau voor Economische Stoomproductie, Rotterdam, Netherlands, a company of the Netherlands Application May 11, 1940, Serial No. 334,611
In the Netherlands May 12, 1939

7 Claims. (Cl. 251—26)

The invention relates to a valve-mechanism, in which the valve body can be brought into the opened or closed position not only by means of rotation (by a hand-wheel or the like) of a screw spindle or nut member connected to the valve body, but also by means of a secondary device, such as a lever. This secondary device may be distance-controlled e. g. by the intermediary of a cable, or electrically, hydraulically, pneumatically etc.

Valves of this type are usual for shutting-off tanks or bilge-conduits on board a ship. It is namely often necessary e. g. in order to increase safety, to permit valves of the kind referred to to be operated from certain points at some distance away from the valve, e. g. on deck or the bridge of a ship, irrespective of the position of the primary or main operation members (hand-wheel or the like) and independently therefrom. The valve must be adapted moreover, to be rapidly opened or shut independently of the position of the valve at that moment.

An object of the invention is the provision of a mechanism which is simple and firm in its construction and reliable in operation and which can easily be operated by hand or by mechanical means, also from a distant spot, such as by a cable, a Bowden wire, a chain or the like or by hydraulical, electrical or pneumatical means.

In the valve mechanism according to the present invention the valve body is moved to and from its seat by means of a normal screw motion device and secondary means are provided for moving said valve body independently of the normal screw motion device. Said secondary means are adapted to be operated by distant control and the part of the screw motion device, which must be stationary for normal operation of the mechanism is movable in the axial direction of the screw members; it is held, however, against axial movement by the pawl device, which forms part of the said secondary means, which comprise a pivotable lever for moving the valve body independently of the normal screw motion device. This lever in its normal position locks the pawl device in the position, in which the latter prevents an axial movement of the nut and is adapted to co-act with the screw motion device in such a manner that in case the valve is already closed by actuating the screw spindle device, it can be opened again by moving the lever.

A preferred embodiment of the invention is illustrated in the drawing.

Fig. 1a shows a detail part.

Figure 1:
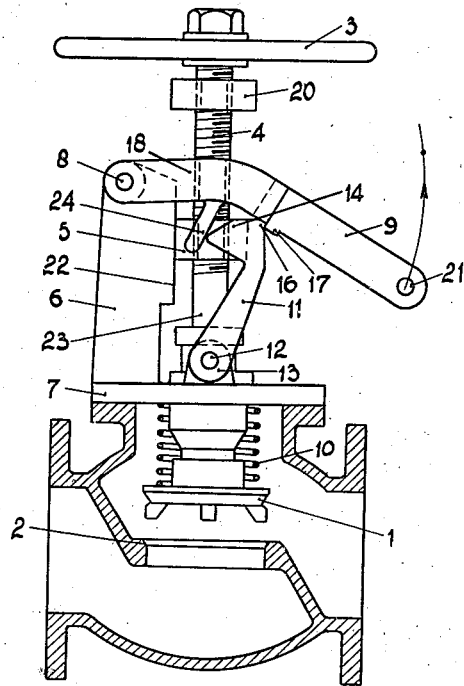
Fig. 1 is an elevation, partly in section, of a valve device according to the invention, in which the valve body (a conical disc) is in the open position.

In the constructional form illustrated in the drawing the valve body or member 1 is formed by a conical disc, which in the position illustrated in Fig. 1 is lifted from its seat 2 by rotation of the hand-wheel 3, together with the screw spindle 4, carrying the valve body 1 into a higher position. The screw spindle 4 is engaged in a nut member 5, provided with corresponding inner screw thread and mounted for sliding movement in the direction of the axis of the screw spindle along a guiding plane 22 of a frame 6, which is attached to or forms part of the cover-plate 7. A lever 9, to which it will be referred later on, is pivotably connected at 8 to the frame 6. The valve body 1 is operable under the influence of a helical compression spring 10, which is capable of moving it into the closed position (vide Fig. 2).

The movement of the member 5 in the direction of the axis of the screw spindle is prevented in the position illustrated in Fig. 1 by a pawl 11, which is pivotably supported at 12 by means of projections 13 on the cover-plate 7 and which is preferably double-headed at 16. The inwardly extending teeth 14 of the pawl catch in recesses 15 of corresponding form (Fig. 2) of the nut member 5. The upper and lower inclined faces of the teeth 14 of the pawl 11 are formed at an angle which is larger than the angle of friction between nut member and pawl, so that the pawl as soon as it is not retained by the lever 9 any longer will flap back into the position shown in Figs. 2 and 3.

To make it more sure that the pawl 11 will fall back at any event, when the lever 9 is drawn away, thus e. g. also when movement of the pawl 11 would be hindered by dirt, rust or foreign matters e. g. in the fulcrum, a projection 24 is provided on the lever 9, which if necessary positively pushes the pawl 11 out of its locking position.

In order to ensure that the pawl 11 will be brought in its inoperative position under all circumstances when the lever 9 is drawn away, said lever is provided with a projection, adapted to engage with the pawl device. This projection may bring the pawl member out of its locking position.

In the position illustrated in Fig. 1 a sliding movement of the nut member 5 in the direction of the axis is not possible, the said member 5 being held against movement by the pawl 11, so that when the hand-wheel 3 is rotated the valve body 1 is moved together with the screw spindle in the sense to or from its seat 2.

The pawl 11 is provided with a cam 16, which is retained by the lever 9 in the position illustrated in Fig. 1 by means of an extending nose 17 on the latter; consequently the pawl 11 is retained in this position as long as the lever 9 (under the influence of its own weight) holds the pawl 11 by means of the nose 17 engaging the cam 16.

As it appears from Fig. 1a the lever 9 is forked. Both legs 18 of the fork so formed extend sideways of the screw spindle 4. These legs 18 are provided with holes 19, through which the shaft or bolt 8 is passed, which is supported by the frame 6.

Figure 2:
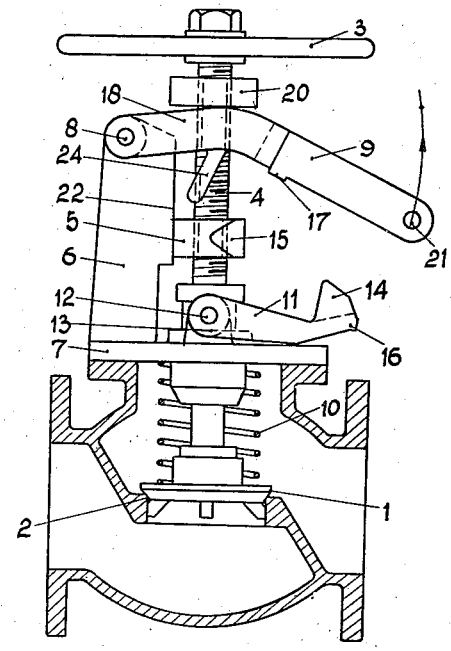
Fig. 2 shows the device illustrated in Fig. 1 after an initial movement of the lever constituting the secondary operative member, with the result that the valve body under the influence of a spring has been brought into the closed position.
Figure 3:
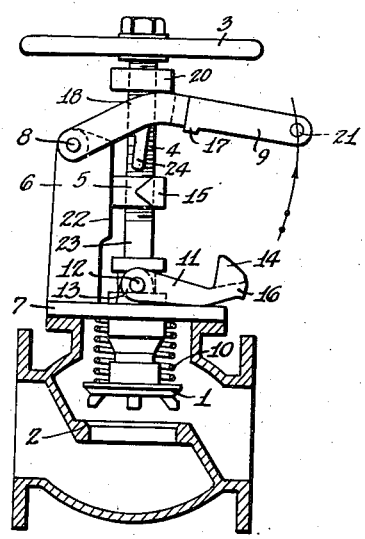
Fig. 3 shows the position of the valve body after being opened again by further movement of the lever in the direction of its initial movement.
Figure 2A:
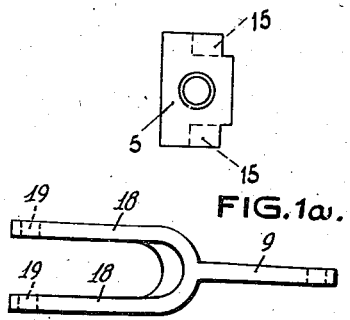
Fig. 2a is a top view of another detail part.

On the screw spindle at some distance only from the top a ring 20 is attached. This ring 20 acts as an abutment for the lever 9 (Figs. 2 and 3). If the lever 9 is swung from the position illustrated in Fig. 2 further upwardly (in the direction of the arrow), it will abut against the ring 20 and consequently the spindle 4 will be drawn upwardly into the position shown in Fig. 3.

The free end of the lever 9 is provided with an eye 21 for attaching to it the end of a Bowden or other wire, a chain or other drawing or operating member to permit distance-control.

The working of the valve is explained hereinafter.

In the position shown in Fig. 1 the valve is opened, i. e. the valve body 1 is clear from the seat 2. Operation, i. e. moving the valve body up and down by rotation of the handwheel 3 is possible without any restriction from the side of the secondary device. The valve may thus be brought if desired into the open or closed position as well, as the part 5, in which the screw thread on the spindle 4 engages is held against movement by the pawl 11 and therefore rotation of the screw spindle causes an axial displacement of itself and thereby of the valve disc 1.

If for some reason it should be necessary to have the valve closed very rapidly and immediately by distance-control from a distant spot, the lever 9 is pulled upwards by the drawing wire or the like, as a consequence whereof first the pawl 11 loses its support against the nose 17 (vide Fig. 1) and falls back into the horizontal position shown in Figs. 2 and 3. From this moment the part 5 is not locked by the pawl 11 any longer, so that the valve body 1 is free to be lowered under the influence of the spring 10 into the closed position. Together with the valve body 1 the screw spindle 4 and also the nut member 5 are moved down, the nut member 5 sliding with its flat side surface along the guiding plane 22 of the frame 6. In this way, fully independently of the hand-wheel 3 but by means of distant control which releases the pawl 11, the valve is closed in the quickest possible way.

Further upward movement of the lever 9, however, causes the valve to be reopened, as the lever 9 upon further movement in the same direction abuts against the ring 20 pushing it in upward direction, together with the screw spindle 4 and valve body 1. The members mentioned will then take the position shown in Fig. 3, in which the valve is open. The lever 9 once being moved a rotative action on the hand-wheel 3 will remain without effect, as the nut member 5 is not locked then against a sliding movement any longer and rotation of the screw spindle 4 would therefore only cause axial displacement of this nut member 5.

After being used as an emergency-valve by means of the lever 9 the nut member 5 of the device is screwed upwards by simply rotating the hand-wheel into the position, in which the teeth of the pawl 11 may re-engage the recesses in the nut member 5. Also the lever will be restored then into its original position and the valve can be operated again normally by the hand-wheel 3.

As stated already in the above the lever 9 can be moved and operated in any desired manner, e. g. electrically, pneumatically, hydraulically etc. Essential is only that upon movement of the lever 9 from a distant point both opening and closing of the valve body 1, independently of the hand-wheel 3, will be enabled.

What I claim is:

1. A valve of the character described comprising a casing having a valve seat therein, a valve in said casing, a spring urging said valve onto its seat, a stem carrying said valve and having a portion provided with screw threads, a nut member threadedly mounted on said stem, means for guiding said nut member for sliding movement relatively to the casing and axially of the stem and for retaining said nut member against rotary movement, releasable means for retaining said nut member in a fixed, non-sliding position, and means operable for releasing the retaining means to permit sliding of said nut member to enable the spring to seat the valve and further operable to displace the valve stem to retract the valve from its seat.

2. A valve of the character described comprising a casing having a valve seat therein, a valve in said casing, a spring urging said valve onto its seat, a stem carrying said valve and having a portion provided with screw threads, a nut member threadedly mounted on said stem, means for guiding said nut member for sliding movement relatively to the casing and axially of the stem and for retaining said nut member against rotary movement, a pawl pivotally mounted on said casing and having a portion engaging the nut member to retain the latter in a fixed, non-sliding position, a lever pivotally mounted on said casing, means on said lever operable upon movement of the lever for displacing said pawl from retaining engagement with the nut member to permit axial displacement of the nut member and seating of the valve, and means carried by the lever and operable upon further movement of the lever to displace the valve stem axially to retract the valve from its seat.

3. A valve of the character described comprising a casing having a valve seat therein, a valve in said casing, a spring urging said valve onto its seat, a stem carrying said valve and having a portion provided with screw threads, a nut member threadedly mounted on said stem, means for guiding said nut member for sliding movement relatively to the casing and axially of the stem and for retaining said nut member against rotary movement, a pawl pivotally mounted on said casing and having a portion engaging the nut member to retain the latter in a fixed, non-sliding position, a lever pivotally mounted on said casing, means on said lever operable upon movement of the lever for displacing said pawl from retaining engagement with the nut member to permit axial displacement of the nut member and seating of the valve, means carried by the lever and operable upon further movement of the lever to displace the valve stem axially to retract the valve from its seat, said pawl and nut member having co-acting cam surfaces to shift the pawl out of engagement with the nut member upon axial movement of the nut member, and means on said lever for releasably blocking shifting of the pawl.

4. A valve of the character described comprising a casing having a valve seat therein, a valve in said casing, a spring urging said valve onto its seat, a stem carrying said valve and having a portion provided with screw threads, a nut member threadedly mounted on said stem, means for guiding said nut member for sliding movement relatively to the casing and axially of the stem and for retaining said nut member against rotary movement, a pawl pivotally mounted on said casing and having a portion engaging the nut member to retain the latter in a fixed, non-sliding position, a lever pivotally mounted on said casing, means on said lever operable upon movement of the lever for displacing said pawl from retaining engagement with the nut member to permit axial displacement of the nut member and seating of the valve, means carried by the lever and operable upon further movement of the lever to displace the valve stem axially to retract the valve from its seat, said pawl and nut member having co-acting cam surfaces to shift the pawl out of engagement with the nut member upon axial movement of the nut member, and means on said lever for releasably blocking shifting of the pawl, said pawl being pivoted at a point between the valve seat and the point of maximum displacement of the nut member toward said seat.

5. A valve of the character described comprising a casing having a valve seat therein, a valve in said casing, a spring urging said valve onto its seat, a stem carrying said valve and having a portion provided with screw threads, a nut member threadedly mounted on said stem, means for guiding said nut member for sliding movement relatively to the casing and axially of the stem and for retaining said nut member against rotary movement, a pawl pivotally mounted on said casing and having a portion engaging the nut member to retain the latter in a fixed, non-sliding position, a lever pivotally mounted on said casing, means on said lever operable upon movement of the lever for displacing said pawl from retaining engagement with the nut member to permit axial displacement of the nut member and seating of the valve, means carried by the lever and operable upon further movement of the lever to displace the valve stem axially to retract the valve from its seat, said pawl and nut member having co-acting cam surfaces to shift the pawl out of engagement with the nut member, and upon axial movement of the nut member, and means on said lever for releasably blocking shifting of the pawl, said pawl being pivoted at a point between the valve seat and the point of maximum displacement of the nut member toward said seat and on an axis intersecting the axis of the valve stem.

6. A valve of the character described comprising a casing having a valve seat therein, a valve in said casing, a spring urging said valve onto its seat, a stem carrying said valve and having a portion provided with screw threads, a nut member threadedly mounted on said stem, means for guiding said nut member for sliding movement relatively to the casing and axially of the stem and for retaining said nut member against rotary movement, a pawl pivotally mounted on said casing and having a portion engaging the nut member to retain the latter in a fixed, non-sliding position, a lever pivotally mounted on said casing, means on said lever operable upon movement of the lever for displacing said pawl from retaining engagement with the nut member to permit axial displacement of the nut member and seating of the valve, and means carried by the lever and operable upon further movement of the lever to displace the valve stem axially to retract the valve from its seat, said lever being carried by the guide for said nut member.

7. A valve of the character described comprising a casing having a valve seat therein, a valve in said casing, a spring urging said valve onto its seat, a stem carrying said valve and having a portion provided with screw threads, a nut member threadedly mounted on said stem, means for guiding said nut member for sliding movement relatively to the casing and axially of the stem and for retaining said nut member against rotary movement, a pawl pivotally mounted on said casing and having a portion engaging the nut member to retain the latter in a fixed, non-sliding position, a lever pivotally mounted on said casing, means carried by the lever and operable upon movement of the lever to displace the valve stem axially to retract the valve from its seat, said pawl and nut member having co-acting cam surfaces to shift the pawl out of engagement with the nut member upon axial movement of the nut member, and means on said lever for releasably blocking shifting of the pawl.

WILLEM BRACKMANN.